United States Patent
Vaishampayan

(10) Patent No.: US 11,655,747 B2
(45) Date of Patent: May 23, 2023

(54) OUTLET PASSAGE FOR AFTERTREATMENT SENSOR

(71) Applicant: Cummins Emission Solutions Inc., Columbus, IN (US)

(72) Inventor: Advait Sunil Vaishampayan, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/774,541

(22) PCT Filed: Nov. 7, 2019

(86) PCT No.: PCT/US2019/060258
§ 371 (c)(1),
(2) Date: May 5, 2022

(87) PCT Pub. No.: WO2021/091561
PCT Pub. Date: May 14, 2021

(65) Prior Publication Data
US 2022/0389854 A1   Dec. 8, 2022

(51) Int. Cl.
*F01N 13/00*   (2010.01)
*F01N 11/00*   (2006.01)
*F01N 13/08*   (2010.01)

(52) U.S. Cl.
CPC ............ *F01N 13/008* (2013.01); *F01N 11/00* (2013.01); *F01N 13/082* (2013.01); *F01N 2470/04* (2013.01)

(58) Field of Classification Search
CPC .... F01N 13/008; F01N 13/082; F01N 13/141; F01N 13/00; F01N 13/08; F01N 13/1833;
(Continued)

(56) References Cited

U.S. PATENT DOCUMENTS

| 4,534,213 A | 8/1985 | Mirikidani |
| 6,242,263 B1 * | 6/2001 | Faber ............... F01N 11/00 73/23.32 |

(Continued)

FOREIGN PATENT DOCUMENTS

| JP | 2018-054312 | 4/2018 |
| JP | 2018-054377 | 4/2018 |

OTHER PUBLICATIONS

International Search Report and Written Opinion issued for PCT Application No. PCT/US2019/060258 dated Jan. 16, 2020, 17 pages.

*Primary Examiner* — Audrey B. Walter
*Assistant Examiner* — Dapinder Singh
(74) *Attorney, Agent, or Firm* — Foley & Lardner LLP

(57) ABSTRACT

An outlet assembly for an aftertreatment system comprises an outlet conduit configured to receive an exhaust gas from the aftertreatment system. The outlet conduit defines a first aperture through a sidewall thereof. An outlet passage is disposed within the outlet conduit. The outlet passage comprises a first end facing an upstream side of the outlet conduit and a second end located downstream from the first end. The second end is fluidly coupled to the first aperture. A hole is defined through an outlet passage sidewall at a radial location that is proximate to the sidewall of the outlet conduit. The hole is configured to allow a sensor to be inserted therethrough into a flow path defined by the outlet passage. The outlet passage is configured to receive a portion of the exhaust gas from the outlet conduit such that the sensor is exposed to the portion of the exhaust gas.

20 Claims, 4 Drawing Sheets

(58) Field of Classification Search
CPC ...... F01N 13/18; F01N 11/00; F01N 2470/04; F01N 2470/02; F01N 2470/00; F01N 2470/12; F01N 2470/14; Y02T 10/12; Y02T 10/40
See application file for complete search history.

(56) References Cited

U.S. PATENT DOCUMENTS

| | | | |
|---|---|---|---|
| 8,256,205 B2* | 9/2012 | Weber | F01N 3/22 |
| | | | 60/287 |
| 9,804,137 B2* | 10/2017 | Doering | G01N 33/0006 |
| 2012/0180457 A1 | 7/2012 | Liu et al. | |
| 2014/0366510 A1 | 12/2014 | Gavin et al. | |
| 2017/0284270 A1 | 10/2017 | Ikeda et al. | |

* cited by examiner

OUTLET PASSAGE FOR AFTERTREATMENT SENSOR

CROSS-REFERENCE TO RELATED APPLICATION

This application is a National Stage of PCT Application No. PCT/US2019/060258, filed Nov. 7, 2019 and the contents of which are incorporated by herein reference in their entirety.

TECHNICAL FIELD

The present application relates generally to the field of sensors for exhaust aftertreatment systems.

BACKGROUND

Exhaust aftertreatment systems are used to receive and treat exhaust gas generated by internal combustion engines. Generally, exhaust gas aftertreatment systems include any of several different components to reduce the levels of harmful exhaust emissions present in the exhaust gas. For example, certain exhaust gas aftertreatment systems for diesel-powered internal combustion engines include a selective catalytic reduction (SCR) system including a catalyst formulated to convert NOx (NO and $NO_2$ in some fraction) into harmless nitrogen gas ($N_2$) and water vapor ($H_2O$) in the presence of ammonia ($NH_3$). Generally, in such aftertreatment systems, an exhaust reductant, (e.g., a diesel exhaust fluid such as urea) is injected into the SCR system to provide a source of ammonia, and mixed with the exhaust gas to partially reduce the NOx gases. The reduction byproducts of the exhaust gas are then fluidly communicated to the catalyst included in the SCR system to decompose substantially all of the NOx gases into relatively harmless byproducts which are expelled out of the aftertreatment system. The exhaust gas also includes particulate matter (PM) such as soot, ash, dust, debris or inorganic PM entrained therein. Generally, filters are used in aftertreatment systems to filter the PM, and PM sensors are used downstream of the filter to measure an amount of PM that remains in the exhaust gas downstream of the filter that can be used to determine a filtering efficiency of the filter. Other sensors may also be disposed downstream of the filter and/or SCR system to determine various operational parameters of the exhaust gas.

SUMMARY

Embodiments described herein relate generally to systems and methods for enhancing performance of a sensor for an aftertreatment system and in particular, to an outlet assembly that includes an outlet passage disposed within the outlet conduit and configured to receive a portion of the exhaust gas flowing through the outlet passage. A sensing tip of a sensor is disposed through the outlet passage such that the sensor is exposed to the portion of the exhaust gas.

In some embodiments, an outlet assembly for an aftertreatment system comprises: an outlet conduit configured to receive an exhaust gas flow of an exhaust gas flowing through the aftertreatment system, the outlet conduit defining a first aperture through a sidewall thereof; and an outlet passage disposed within the outlet conduit, the outlet passage comprising: a first end facing an upstream side of the outlet conduit, a second end located downstream from the first end, the second end fluidly coupled to the first aperture, and a hole defined through an outlet passage sidewall at a radial location that is proximate to the sidewall of the outlet conduit, the hole configured to allow a sensor to be inserted therethrough into a flow path defined by the outlet passage, wherein the outlet passage is configured to receive a portion of the exhaust gas from the outlet conduit such that the sensor is exposed to the portion of the exhaust gas.

In some embodiments, an aftertreatment system comprises: an exhaust conduit defining an internal volume within which at least one aftertreatment component configured to treat constituents of an exhaust gas flowing through the aftertreatment system is disposed; an outlet assembly is fluidly coupled to the exhaust conduit and configured to receive the exhaust gas from the exhaust conduit, the outlet assembly comprises: an outlet conduit coupled to the exhaust conduit, the outlet conduit defining a first aperture through a sidewall thereof, and an outlet passage disposed within the outlet conduit, the outlet passage comprising: a first end facing an upstream side of the outlet conduit, a second end located downstream from the first end, the second end fluidly coupled to the first aperture, and a hole defined through an outlet passage sidewall at a radial location that is proximate to the sidewall of the outlet conduit. A sensor is disposed through the hole into the flow path defined by the outlet passage, wherein the outlet passage is configured to receive a portion of the exhaust gas from the outlet conduit such that the sensor is exposed to the portion of the exhaust gas.

In some embodiments, a method for enhancing a functionality of a sensor of an aftertreatment system comprises: providing an exhaust conduit configured to house an aftertreatment component of the aftertreatment system; coupling an outlet assembly to the exhaust conduit, the outlet assembly comprising: an outlet conduit defining a first aperture through a sidewall thereof, and an outlet passage disposed within the outlet conduit, the outlet passage comprising: a first end facing an upstream side of the outlet conduit, a second end located downstream from the first end, the second end fluidly coupled to the first aperture, and a hole defined through an outlet passage sidewall at a radial location that is proximate to the sidewall of the outlet conduit, wherein the outlet conduit is coupled to the exhaust conduit; and inserting a sensor through the hole into a flow path defined by the outlet passage, wherein the outlet passage is configured to receive a portion of the exhaust gas from the exhaust conduit such that the sensor is exposed to the portion of the exhaust gas.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
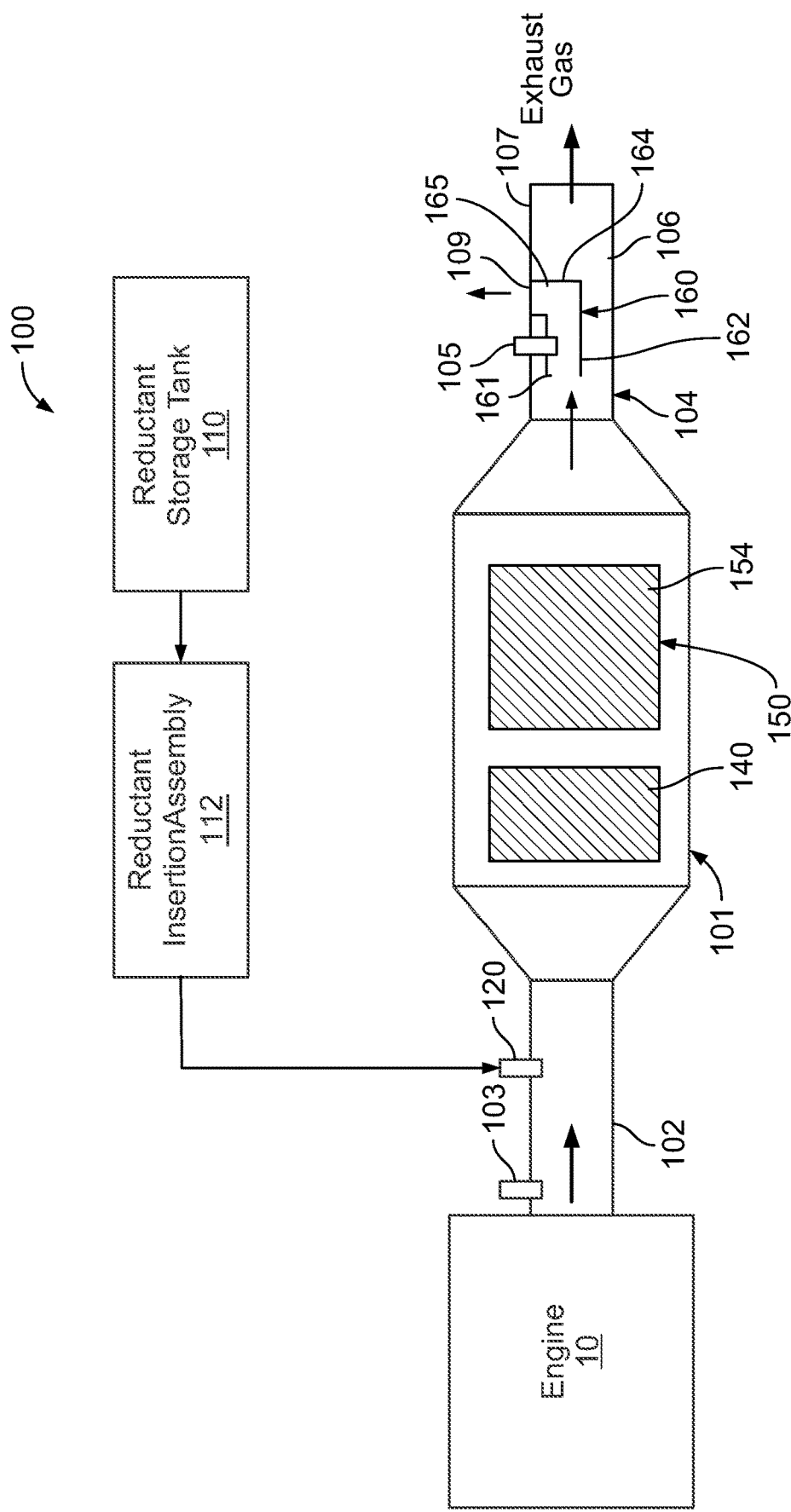
FIG. 1 is a schematic block diagram of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for enhancing performance of a sensor for an aftertreatment system and in particular, to an outlet assembly that includes an outlet passage disposed within the outlet conduit and configured to receive a portion of the exhaust gas flowing through the outlet passage. A sensing tip of a sensor is disposed through the outlet passage such that the sensor is exposed to the portion of the exhaust gas.

Aftertreatment systems include various sensors disposed in an outlet passage or a tail pipe of the aftertreatment system, that are configured to measure various operational parameters, e.g., NOx concentration, oxygen concentration, carbon monoxide concentration, or particulate matter (PM) concentration, in the exhaust gas being expelled into the environment after passing through the aftertreatment system. The functionality, for example, sensitivity of PM sensors may be dependent on the flow velocity of the exhaust gas at a sensing tip of the sensor and/or a sampling volume of the exhaust gas at the sensing tip of the sensor. In conventional aftertreatment systems, the flow velocity of the exhaust gas and sampling volume of the exhaust gas that the sensing tip of the sensor is exposed to are defined by the operational parameters of the engine and/or the aftertreatment system and do not have any structures to alter the flow velocity and/or sampling volume at the outlet of such aftertreatment systems that can enhance the functionality of the sensors disposed proximate to the outlet of the aftertreatment system.

Also, water (e.g., rain water) may sometimes enter into the aftertreatment system through an outlet of the aftertreatment system. If the water entering the aftertreatment system contacts one or more of the sensors disposed in the outlet passage, the water may damage the sensors disposed in the outlet leading to sensor replacement and increased maintenance costs.

Various embodiments of the outlet conduit assemblies described herein may provide one or more benefits including, for example: (1) enhancing functionality of sensors, particularly PM sensors, by providing an outlet passage disposed within an outlet conduit that receives a sensing tip of the sensor and enhances functionality of the sensor by increasing a flow velocity and sampling volume within the outlet passage; (2) protecting a sensing tip of the sensor from water damage; and (3) increasing sensor life, thereby reducing maintenance costs.

FIG. 1 is a schematic illustration of an aftertreatment system 100, according to an embodiment. The aftertreatment system 100 is configured to receive an exhaust gas (e.g., a diesel exhaust gas) from an engine 10 and decompose constituents of the exhaust gas such as, for example, NOx gases, CO, etc. The aftertreatment system 100 includes a reductant storage tank 110, a reductant insertion assembly 112, a reductant injector 120, an exhaust conduit 101 within which a SCR system 150 is disposed, and an outlet assembly 104 coupled to the exhaust conduit 101, and may also include a filter 140 disposed upstream of the SCR system 150 within the exhaust conduit 101.

The engine 10 may be an internal combustion engine, for example a diesel engine, a gasoline engine, a natural gas engine, a biodiesel engine, a dual fuel engine, an alcohol engine, an E85 or any other suitable internal combustion engine.

The reductant storage tank 110 contains a reductant formulated to facilitate reduction of the constituents of the exhaust gas (e.g., NOx gases) by a catalyst 154 included in the SCR system 150. In embodiments in which the exhaust gas is a diesel exhaust gas, the reductant may include a diesel exhaust fluid (DEF) which provides a source of ammonia. Suitable DEFs can include urea, aqueous solution of urea or any other DEF (e.g., the DEF available under the tradename ADBLUE®). In particular embodiments, the reductant includes an aqueous urea solution containing 32.5% urea and 67.5% de-ionized water. In other embodiments, the reductant includes aqueous urea solution containing 40% urea and 60% de-ionized water.

The SCR system 150 is configured to receive and treat the exhaust gas (e.g., a diesel exhaust gas) flowing through the SCR system 150 in the presence of ammonia. The exhaust conduit 101 defines an exhaust flow path within which the SCR system 150 is disposed. In some embodiments, the exhaust conduit 101 includes an inlet tube 102 positioned upstream of the SCR system 150 and configured to receive exhaust gas from the engine 10 and communicate the exhaust gas to the SCR system 150. The outlet assembly 104 is coupled to the exhaust conduit 101 and is configured to receive the exhaust gas from the exhaust conduit 101.

An upstream sensor 103 may be positioned in the inlet tube 102. The upstream sensor 103 may include, for example a NOx sensor (e.g., a physical or virtual NOx sensor), an oxygen sensor, a particulate matter sensor, a carbon monoxide sensor, a temperature sensor, a pressure sensor, any other sensor or a combination thereof configured to measure one or more operational parameters of the exhaust gas. Such operating parameters may include, for example, an amount of NOx gases in the exhaust gas, a temperature of the exhaust gas, a flow rate and/or pressure of the exhaust gas.

The SCR system 150 includes at least one catalyst 154 positioned within an internal volume defined by the exhaust conduit 101. In some embodiments, the SCR system 150 may comprise a selective catalytic reduction filter (SCRF), or any other aftertreatment component configured to decompose constituents of the exhaust gas (e.g., NOx gases such as such nitrous oxide, nitric oxide, nitrogen dioxide, etc.), flowing through the exhaust conduit 101 in the presence of a reductant, as described herein. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that NOx gases included in the exhaust gas are further reduced to yield an exhaust gas which is substantially free of carbon monoxide and NOx gases.

In some embodiments, a filter 140 (e.g., a diesel particulate filter) may be disposed within the exhaust conduit 101 upstream of the SCR system 150. The filter 140 is configured to filter particulate matter such as soot or ash entrained in the exhaust gas flowing through the aftertreatment system 100. In various embodiments, the aftertreatment system 100 may also include other aftertreatment components such as, for example, an oxidation catalyst (e.g., a diesel oxidation catalyst), ammonia oxidation catalysts, mixers, baffle plates, or any other suitable aftertreatment component. Such aftertreatment components may be positioned upstream or downstream of the SCR system 150 within the exhaust conduit 101.

The reductant insertion assembly 112 is fluidly coupled to the reductant storage tank 110 and is configured to provide the reductant to the reductant injector 120 positioned upstream of the SCR system 150. The reductant insertion assembly 112 may comprise various structures to facilitate receipt of the reductant from the reductant storage tank 110 and delivery to the reductant injector 120, as described in detail herein.

In various embodiments, the reductant insertion assembly 112 may include one or more pumps (e.g., a diaphragm pump, a positive displacement pump, a centrifugal pump, a vacuum pump, etc.) for delivering the reductant to the reductant injector 120 at an operating pressure and/or flow rate. The reductant insertion assembly 112 may also include filters and/or screens (e.g., to prevent solid particles of the reductant or contaminants from flowing into the one or pumps) and/or valves (e.g., check valves) configured to draw reductant from the reductant storage tank 110. Screens, check valves, pulsation dampers, or other structures may also be positioned downstream of the one or more pumps of the reductant insertion assembly 112 and configured to remove contaminants and/or facilitate delivery of the reductant to the reductant injector 120.

In various embodiments, the reductant insertion assembly 112 may also include a bypass line structured to provide a return path of the reductant from the one or more pumps to the reductant storage tank 110. A valve (e.g., an orifice valve) may be provided in the bypass line to allow selective returning of the reductant to the reductant storage tank 110 (e.g., when the engine 10 is turned OFF or during a purge operation of the reductant insertion assembly 112).

The outlet assembly 104 is coupled to the exhaust conduit 101. The outlet assembly 104 includes an outlet conduit 106 configured to receive the exhaust gas from the aftertreatment system 100. The outlet conduit 106 defines a first aperture 109 through a sidewall 107 of the outlet conduit 106.

The outlet assembly 104 also includes an outlet passage 160 disposed within the outlet conduit 106. The outlet passage 160 includes a first end 161 facing an upstream side of the outlet conduit 106, and a second end 165 located downstream from the first end 161. The second end 165 is fluidly coupled to the first aperture 109. A hole is defined through an outlet passage sidewall of the outlet passage 160 at a radial location that is proximate to the sidewall 107 of the outlet conduit 106 where the first aperture 109 is defined.

The hole is configured to allow a sensor 105 to be inserted therethrough into a flow path defined by the outlet passage 160. In some embodiments, the sensor 105 may be a PM sensor. In other embodiments, the sensor 105 may be a NOx sensor, an oxygen sensor, an ammonia sensor, a temperature sensor, or any other suitable sensor or combination of sensors. The outlet conduit 106 may define a second aperture at a location proximate to the hole upstream of the first aperture 109, and configured to allow the sensor 105 to be inserted therethrough into the outlet passage 160 via the hole. The second aperture may be defined through the sidewall 107 of the outlet conduit 106 upstream of the first aperture 109, and the sensor 105 may be inserted such that a sensing tip of the sensor 105 is inserted through the hole defined in the outlet passage 160 and disposed in a flow path defined by the outlet passage 160.

The outlet passage 160 is configured to receive a portion of the exhaust gas flow from the outlet conduit 106 such that the sensor 105 is exposed to the portion of the exhaust gas. As shown in FIG. 1, the outlet passage 160 has a smaller cross-sectional width than the outlet conduit 106 but is sufficiently large for incorporating at least a tip of the sensor 105. The cross-sectional width of the outlet passage 160 determines a sampling volume of the portion of the exhaust gas. The faster velocity of the portion of the exhaust gas enhances the functionality (e.g., increases sensitivity) of the sensor 105.

Expanding further, atmospheric pressure of the environment surrounding the aftertreatment system 100 is substantially less than the pressure inside the outlet conduit 106. If an alternate path is provided for the exhaust gases to escape, the flow and velocity of the exhaust gas can be beneficially manipulated. Providing the outlet passage 160 that is coupled to the first aperture 109, provides an alternate outlet for the portion of the exhaust gas, and creates a large pressure difference. As flow occurs from a higher pressure area to a lower pressure area, the exhaust gas naturally tries to escape via the outlet passage 160 as it provides a quicker and shorter escape route relative to the outlet conduit 106.

Because of this created pressure difference, the exhaust gas flow and velocity through the outlet passage 160 increases. The location of the outlet passage 160 is selected to be radially inwards of a location at which the sensor 105 is inserted into the outlet conduit 106, thus allowing the sensing tip of the sensor 105 to be inserted through the hole into the flow path defined by the outlet passage 160. The increase in flow volume and velocity of the portion of the exhaust gas and thereby, on the sensing tip of the sensor 105 relative to bulk of the exhaust gas flowing through the outlet conduit 106 enhances the functionality of the sensor 105.

As shown in FIG. 1, the outlet passage may include a first portion 162, and a second portion 164 located downstream of the first portion 162. The first portion 162 is substantially aligned with a gas axis of the outlet conduit and defines a first portion inlet located at the first end 161 that is configured to receive the portion of the exhaust gas. As used herein, the term "substantially aligned" implies that an axis of the first portion 162 is within ±5 degrees of the axis of the outlet conduit 106. The second portion 164 is inclined at angle with respect to the first portion 162, and defines a second portion outlet located at the second end 165 configured to expel the portion of the exhaust gas into the environment via the first aperture 109. In some embodiments, the angle is in a range of 30 degrees to 90 degrees.

In some embodiments, a tail pipe (e.g., tail pipe 208 shown in FIG. 2) may be coupled to the outlet conduit 106 downstream of the outlet passage 160. In addition to enhancing the functionality of the sensor 105, the outlet passage 160 also protects the sensing tip of the sensor 105 from coming in contact with any water that makes its way inside the outlet conduit 106. In some embodiments, the outlet assembly 104 may also include a step (e.g., step 370 shown in FIG. 4) disposed on an outer surface of the sidewall 107 of the outlet conduit 106 around at least a portion of a periphery of the first aperture 109. The step may be configured to prevent water from entering the outlet passage 160 via the first aperture 109. For example, the aftertreatment system 100 may be mounted vertically on a mounting structure. In such embodiments, the step prevents water (e.g., rain water) from flowing into the outlet passage 160 thereby offering further protection to the sensing tip of the sensor 105.

Figure 2:
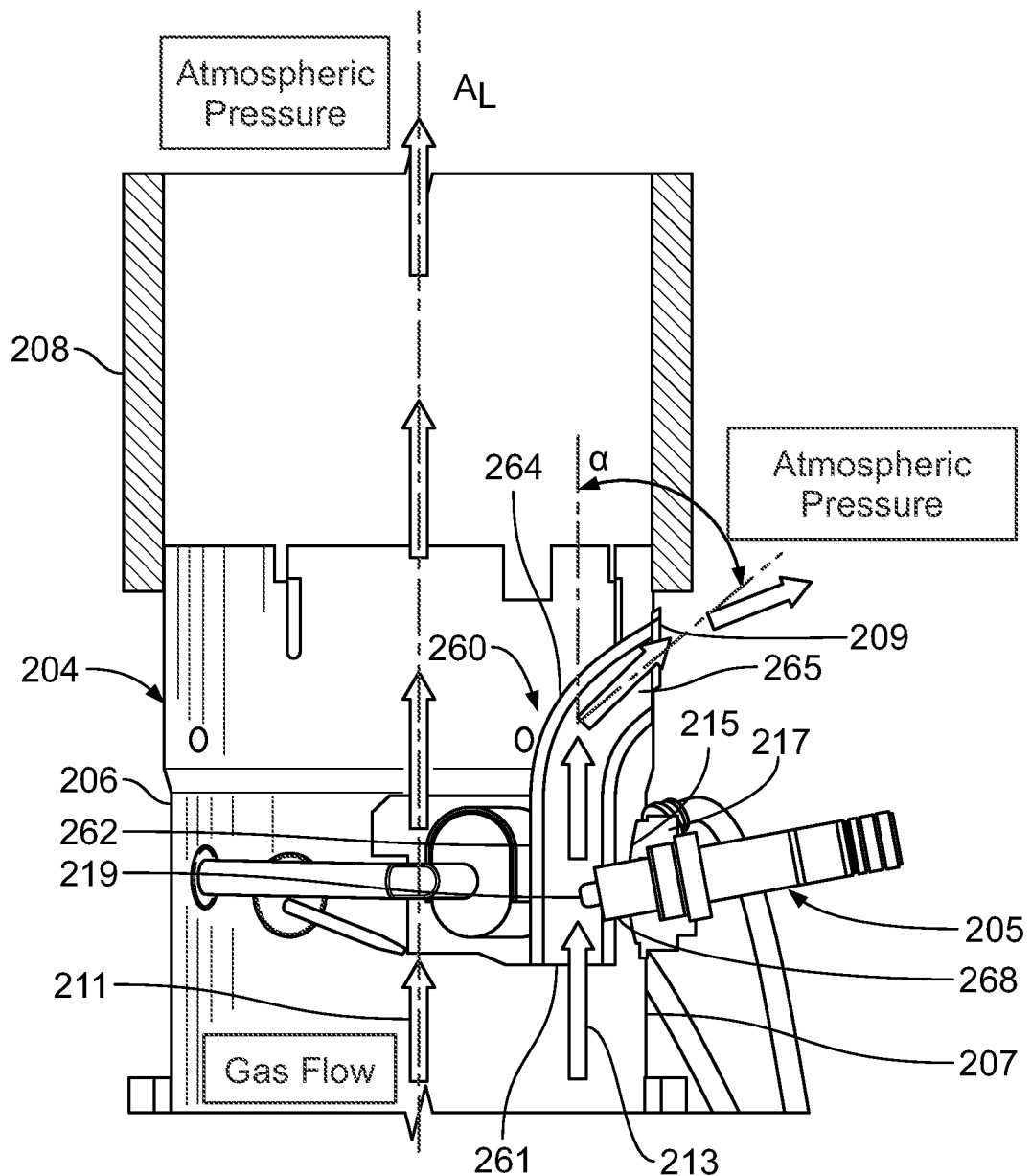
FIG. 2 is a side cross-section view of an outlet assembly for an aftertreatment system, according to an embodiment.
Figure 3:
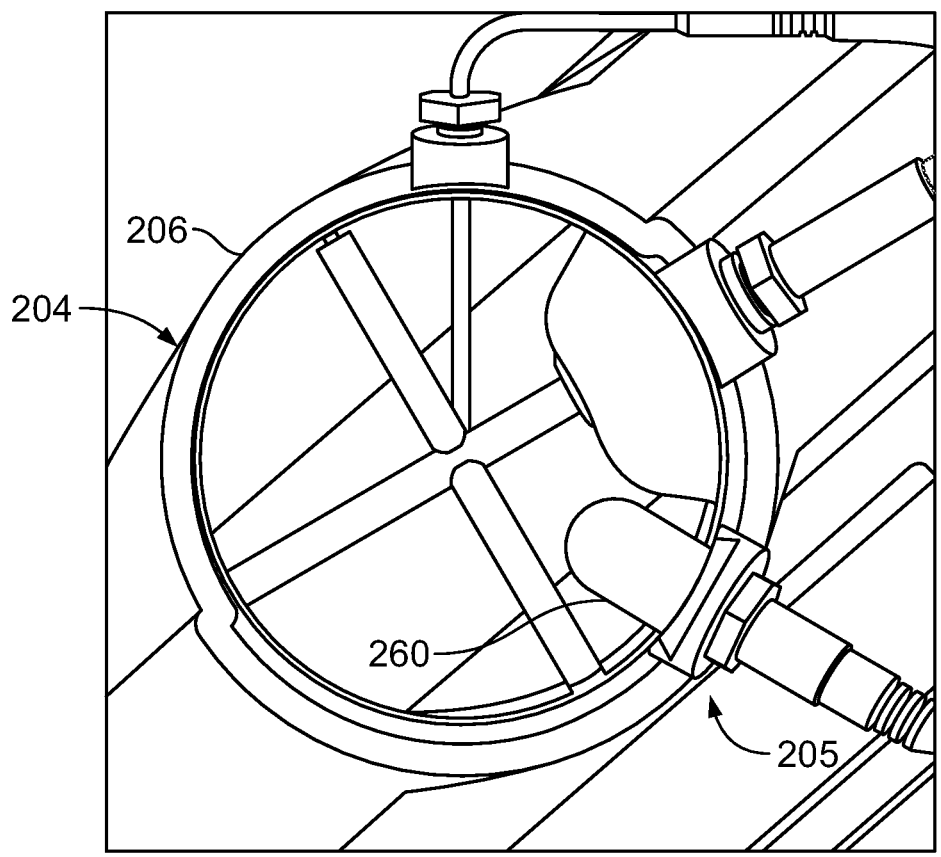
FIG. 3 is a top view of the outlet assembly of FIG. 2.

FIGS. 2-3 show various views of an outlet assembly 204, according to another embodiment. The outlet assembly 204 is configured to be coupled to an exhaust conduit, for example, the exhaust conduit 101. The outlet assembly 204 includes an outlet conduit 206 configured to receive an exhaust gas 211 from an aftertreatment system (e.g., the aftertreatment system 100). A tail pipe 208 may be coupled to an end of the outlet conduit 206 that is located distal from the exhaust conduit. The outlet conduit 206 defines a first aperture 209 through a sidewall 207 of the outlet conduit 206. The outlet assembly 204 also includes an outlet passage 260 disposed within the outlet conduit 206. The outlet passage 260 includes a first end 261 facing an upstream side of the outlet conduit 206, and a second end 265 located downstream from the first end 261. The second end 265 is fluidly coupled to the first aperture 209.

A hole 268 is defined through an outlet passage sidewall of the outlet passage 260 at a radial location that is proximate to the sidewall 207 of the outlet conduit 206 where the first aperture 209 is defined. The hole 268 is configured to allow a sensor 205 (e.g., a PM sensor) to be inserted therethrough into a flow path defined by the outlet passage 260. The outlet conduit 206 may define a second aperture 215 at a location proximate to the hole 268 upstream of the first aperture 209, and configured to allow the sensor 205 to be inserted therethrough such that a sensing tip 219 of the sensor 205 can be inserted into the outlet passage 260 via the hole 268. The second aperture 215 may be defined through the sidewall 207 of the outlet conduit 206 upstream of the first aperture 209. A sealing member 217 (e.g., a gasket) may be disposed between a body of the sensor 205 and the second aperture 215 to fluidly seal the second aperture 215 once the sensor 205 is inserted therethrough.

The outlet passage 260 is configured to receive a portion 213 of the exhaust gas 211 from the outlet conduit 206 such that the sensor 205 is exposed to the portion 213 of the exhaust gas. As shown in FIG. 2, the outlet passage 260 has a smaller cross-sectional width (e.g., diameter) than the outlet conduit 206. The cross-sectional width of the outlet passage 260 determines a sampling volume of the portion of the exhaust gas flowing therethrough. The faster velocity of the portion 213 of the exhaust gas enhances the functionality (e.g., increases sensitivity) of the sensor 205, as previously described herein. Furthermore, the outlet passage 260 also protects the sensing tip 219 of the sensor 205 from water damage.

As shown in FIG. 2, the outlet passage 260 may include a first portion 262, and a second portion 264 located downstream of the first portion 262. The first portion 262 is substantially aligned with an axis $A_L$ of the outlet conduit 206 and defines a first portion inlet located at the first end 261 configured to receive the portion 213 of the exhaust gas 211. The second portion 264 is inclined at angle α with respect to the first portion 262, and defines a second portion outlet located at the second end 265 configured to expel the portion 213 of the exhaust gas into the environment via the first aperture 209. In some embodiments, the angle α is in a range of 30 degrees to 90 degrees.

Figure 4:
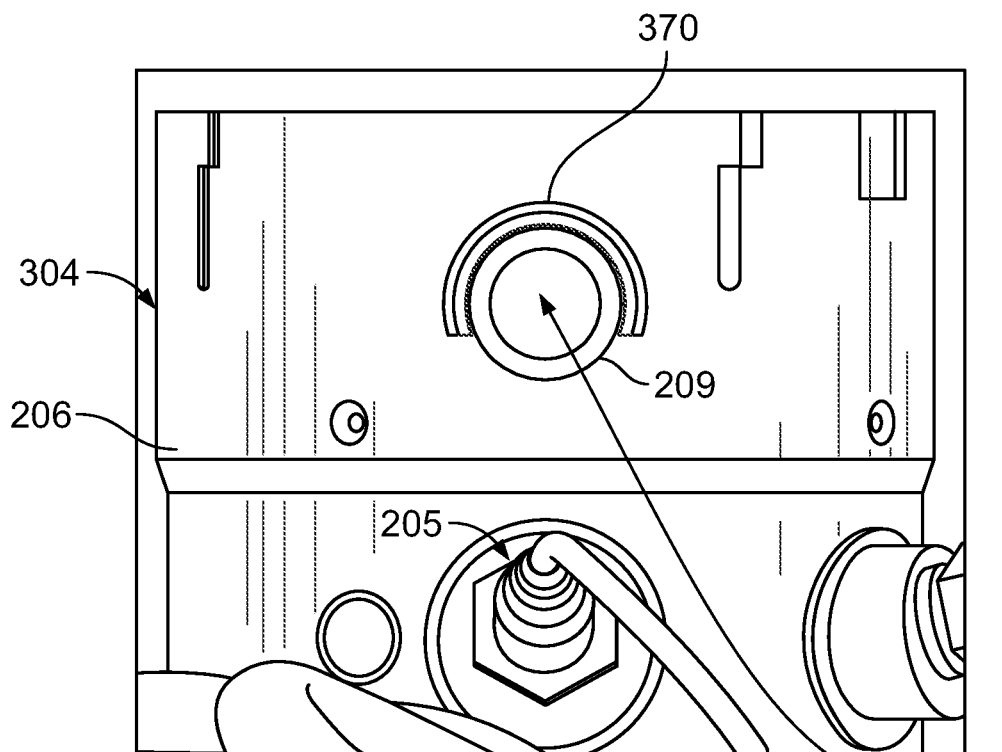
FIG. 4 is a side view of an outlet assembly for an aftertreatment system, according to another embodiment.

FIG. 4 is a side view of an outlet assembly 304 for an aftertreatment system (e.g., the aftertreatment system 100), according to another embodiment. The outlet assembly 304 includes the outlet conduit 206 having the outlet passage 260 disposed within a flow path defined by the outlet conduit 206. The outlet assembly 304 also includes a step 370 disposed on an outer surface of the sidewall 207 of the outlet conduit 206 around at least a portion of a periphery of the first aperture 209. The step 370 serves as water shield to prevent water, for example, rain water flowing into the first aperture 209 along an outer surface of the outlet conduit 206 from entering the outlet passage 260 via the first aperture 209.

Figure 5:
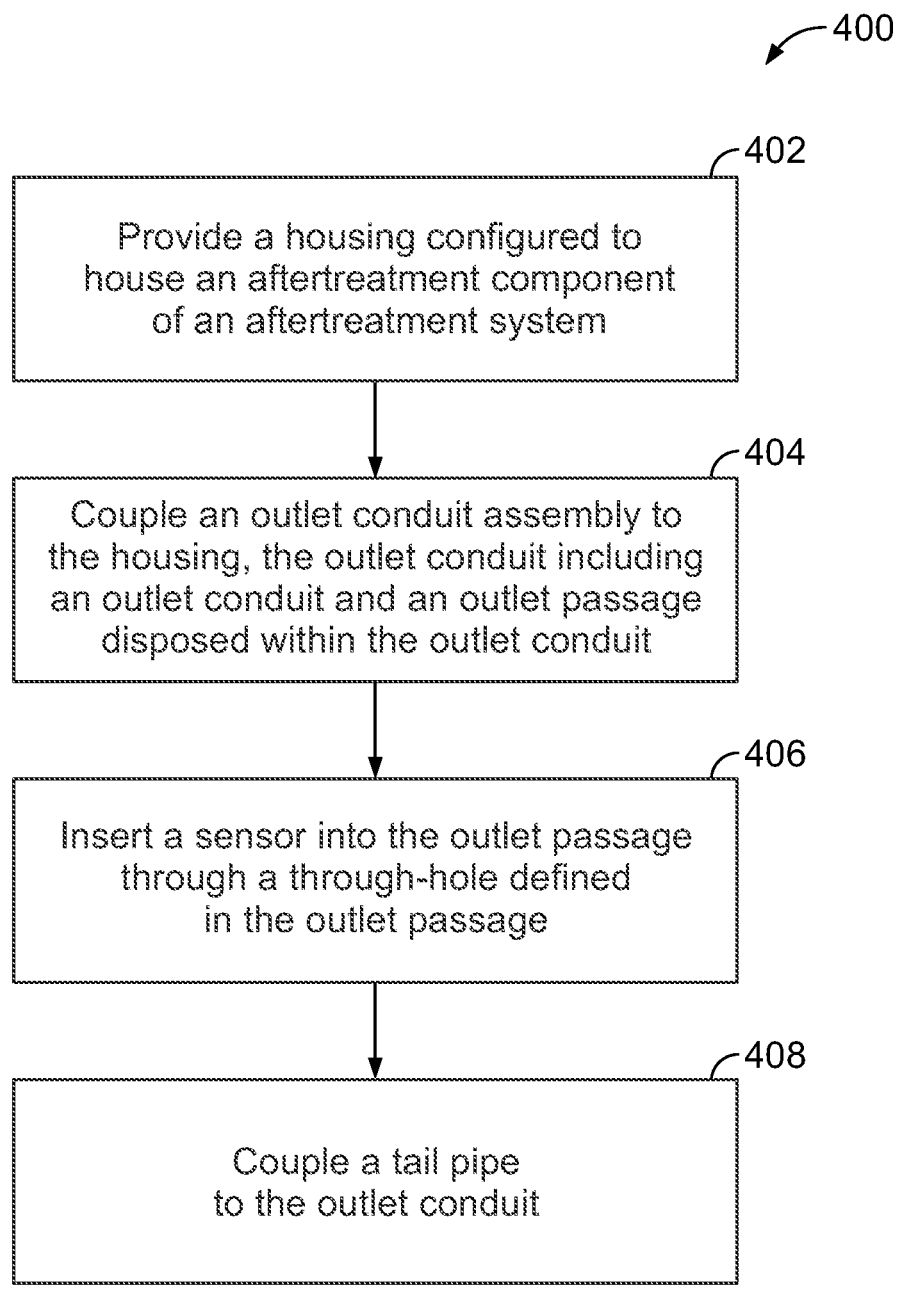
FIG. 5 is schematic flow diagram of a method for enhancing performance of a sensor of an aftertreatment system, according to an embodiment.

FIG. 5 is a schematic flow diagram of an example method 400 for enhancing functionality of a sensor of an aftertreatment system (e.g., the aftertreatment system 100), according to an embodiment. The method 400 includes providing an exhaust conduit (e.g., the exhaust conduit 101) configured to house an aftertreatment component (e.g., the SCR system 150 and/or the filter 140) of the aftertreatment system (e.g., the aftertreatment system 100), at 402.

At 404, an outlet assembly (e.g., the outlet assembly 104, 204, 304) is coupled to the exhaust conduit. The outlet assembly includes an outlet conduit (e.g., the outlet conduit 106, 206) that is coupled to the exhaust conduit. The outlet conduit defines a first aperture (e.g., the first aperture 109, 209) through a sidewall of the outlet conduit. An outlet passage (e.g., the outlet passage 160, 260) disposed within the outlet conduit. The outlet passage includes a first end facing an upstream side of the outlet conduit, and a second end located downstream from the first end. The second end is fluidly coupled to the first aperture. A hole is defined through an outlet passage sidewall at a radial location that is proximate to the sidewall of the outlet conduit.

At 406, a sensor (e.g., the sensor 105, 205) is inserted through the hole into a flow path defined by the outlet passage. The outlet passage is configured to receive a portion of the exhaust gas from the exhaust conduit such that the sensor is exposed to the portion of the exhaust gas. In some embodiments, a tail pipe may also be coupled to the outlet conduit, at 408.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An outlet assembly for an aftertreatment system, comprising:
   an outlet conduit configured to receive an exhaust gas from the aftertreatment system, the outlet conduit defining a first aperture through a sidewall thereof, the first aperture extending through the sidewall in a direction transverse to a longitudinal axis of the outlet assembly; and
   an outlet passage disposed within the outlet conduit, the outlet passage comprising:
     a first end facing an upstream side of the outlet conduit,
     a second end located downstream from the first end, the second end fluidly coupled to the first aperture and exposed to an environment external to the aftertreatment system, and
     a hole defined through an outlet passage sidewall at a radial location that is proximate to the sidewall of the outlet conduit, the hole configured to allow a sensor to be inserted therethrough into a flow path defined by the outlet passage,
   wherein the outlet passage is configured to receive a portion of the exhaust gas from the outlet conduit such that the sensor is exposed to the portion of the exhaust gas, the outlet passage configured to expel the portion of the exhaust gas into the environment through the first aperture.

2. The outlet assembly of claim 1, wherein a cross-sectional width of the outlet passage is smaller than a cross-sectional width of the outlet conduit.

3. The outlet assembly of claim 1, wherein the outlet passage comprises:
   a first portion that is substantially aligned with an axis of the outlet conduit, and
   a second portion located downstream of the first portion and that is inclined at an angle with respect to the first portion.

4. The outlet assembly of claim 3, wherein the angle is in a range of 30 degrees to 90 degrees.

5. The outlet assembly of claim 1, further comprising a step disposed on an outer surface of the sidewall of the outlet conduit around at least a portion of a periphery of the first aperture, the step configured to prevent water from entering the outlet passage through the first aperture.

6. The outlet assembly of claim 1, wherein the outlet conduit defines a second aperture at a location proximate to the hole, the second aperture configured to allow the sensor to be inserted therethrough into the outlet passage via the hole.

7. The outlet assembly of claim 1, further comprising a tail pipe coupled to the outlet conduit downstream of the outlet passage.

8. An aftertreatment system, comprising:
   an exhaust conduit defining an internal volume within which at least one aftertreatment component configured to treat constituents of an exhaust gas flowing through the aftertreatment system is disposed;
   an outlet assembly fluidly coupled to the exhaust conduit and configured to receive the exhaust gas from the exhaust conduit, the outlet assembly comprising:
     an outlet conduit coupled to the exhaust conduit, the outlet conduit defining a first aperture through a sidewall thereof, the first aperture extending through the sidewall in a direction transverse to a longitudinal axis of the outlet assembly, and
     an outlet passage disposed within the outlet conduit, the outlet passage comprising:
       a first end facing an upstream side of the outlet conduit,
       a second end located downstream from the first end, the second end fluidly coupled to the first aperture and exposed to an environment external to the aftertreatment system, and
       a hole defined through an outlet passage sidewall at a radial location that is proximate to the sidewall of the outlet conduit; and
   a sensor disposed through the hole into the flow path defined by the outlet passage,
   wherein the outlet passage is configured to receive a portion of the exhaust gas from the outlet conduit such that the sensor is exposed to the portion of the exhaust gas, the outlet passage configured to expel the portion of the exhaust gas into the environment through the first aperture.

9. The aftertreatment system of claim 8, wherein a cross-sectional width of the outlet passage is smaller than a cross-sectional width of the outlet conduit.

10. The aftertreatment system of claim 8, wherein the outlet passage comprises:
    a first portion that is substantially aligned with an axis of the outlet conduit; and
    a second portion located downstream of the first portion and that is inclined at angle with respect to the first portion.

11. The aftertreatment system of claim 10, wherein the angle is in a range of 30 degrees to 90 degrees.

12. The aftertreatment system of claim 8, further comprising a step disposed on an outer surface of the sidewall of the outlet conduit around at least a portion of a periphery of the first aperture, the step configured to prevent water from entering the outlet passage.

13. The aftertreatment system of claim 8, wherein the outlet conduit defines a second aperture at a location proximate to the hole, the second aperture configured to allow the sensor to be inserted therethrough into the outlet passage via the hole.

14. The aftertreatment system of claim 8, further comprising a tail pipe coupled to an outlet conduit downstream of the outlet passage.

15. A method for enhancing a functionality of a sensor of an aftertreatment system, comprising:
   providing an exhaust conduit configured to house an aftertreatment component of the aftertreatment system;
   coupling an outlet assembly to the exhaust conduit, the outlet assembly comprising:
      an outlet conduit defining a first aperture through a sidewall thereof, the first aperture extending through the sidewall in a direction transverse to a longitudinal axis of the outlet assembly, and
      an outlet passage disposed within the outlet conduit, the outlet passage comprising:
         a first end facing an upstream side of the outlet conduit,
         a second end located downstream from the first end, the second end fluidly coupled to the first aperture and exposed to an environment external to the aftertreatment system, and
         a hole defined through an outlet passage sidewall at a radial location that is proximate to the sidewall of the outlet conduit,
      wherein the outlet conduit is coupled to the exhaust conduit; and
   inserting a sensor through the hole into a flow path defined by the outlet passage,
   wherein the outlet passage is configured to receive a portion of the exhaust gas from the exhaust conduit such that the sensor is exposed to the portion of the exhaust gas, the outlet passage configured to expel the portion of the exhaust gas into the environment through the first aperture.

16. The method of claim 15, wherein a cross-sectional width of the outlet passage is smaller than a cross-sectional width of outlet conduit.

17. The method of claim 16, wherein the outlet passage comprises:
   a first portion that is substantially aligned with an axis of the outlet conduit; and
   a second portion located downstream of the first portion and that is inclined at an angle with respect to the first portion.

18. The method of claim 17, wherein the angle is in a range of 30 degrees to 90 degrees.

19. The method of claim 15, wherein the outlet assembly further comprises a step disposed on an outer surface of the sidewall of the outlet conduit around at least a portion of a periphery of the first aperture, the step configured to prevent water from entering the outlet passage.

20. The method of claim 15, further comprising:
   coupling a tail pipe to the outlet conduit downstream of the outlet passage.

* * * * *